Oct. 15, 1929.　　　A. J. MASON　　　1,731,821
HARVESTING MACHINE
Filed July 11, 1927　　　6 Sheets-Sheet 1
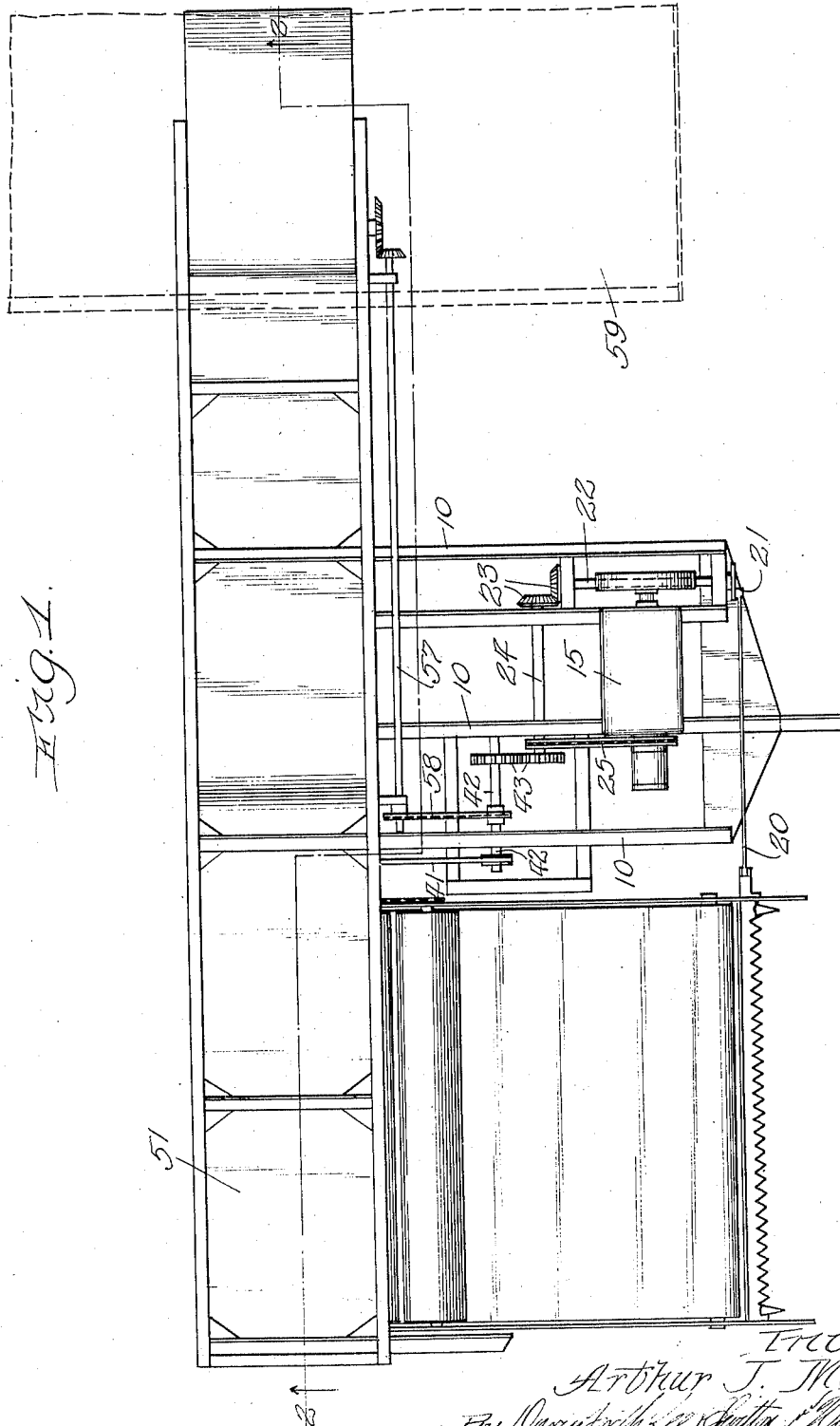

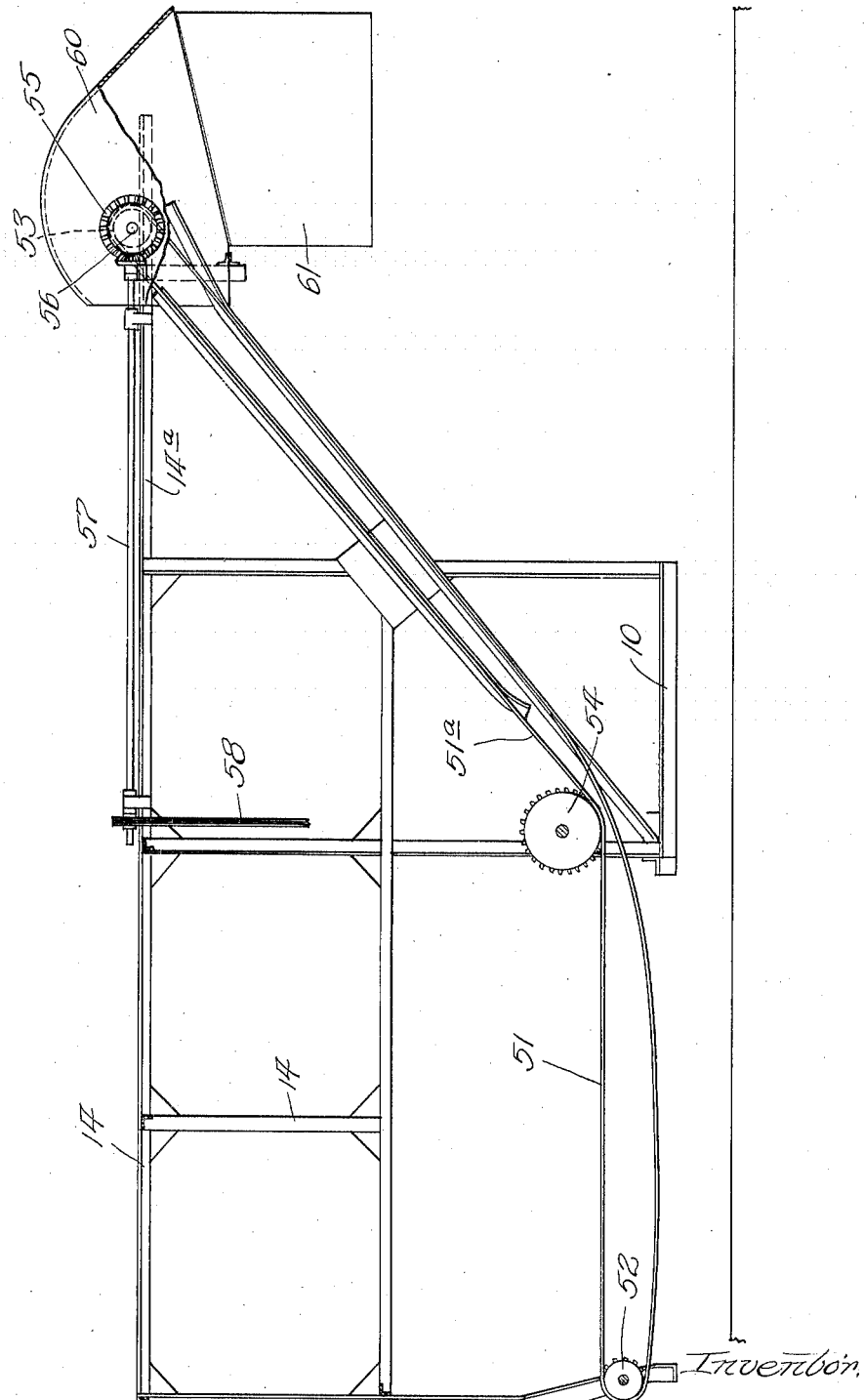

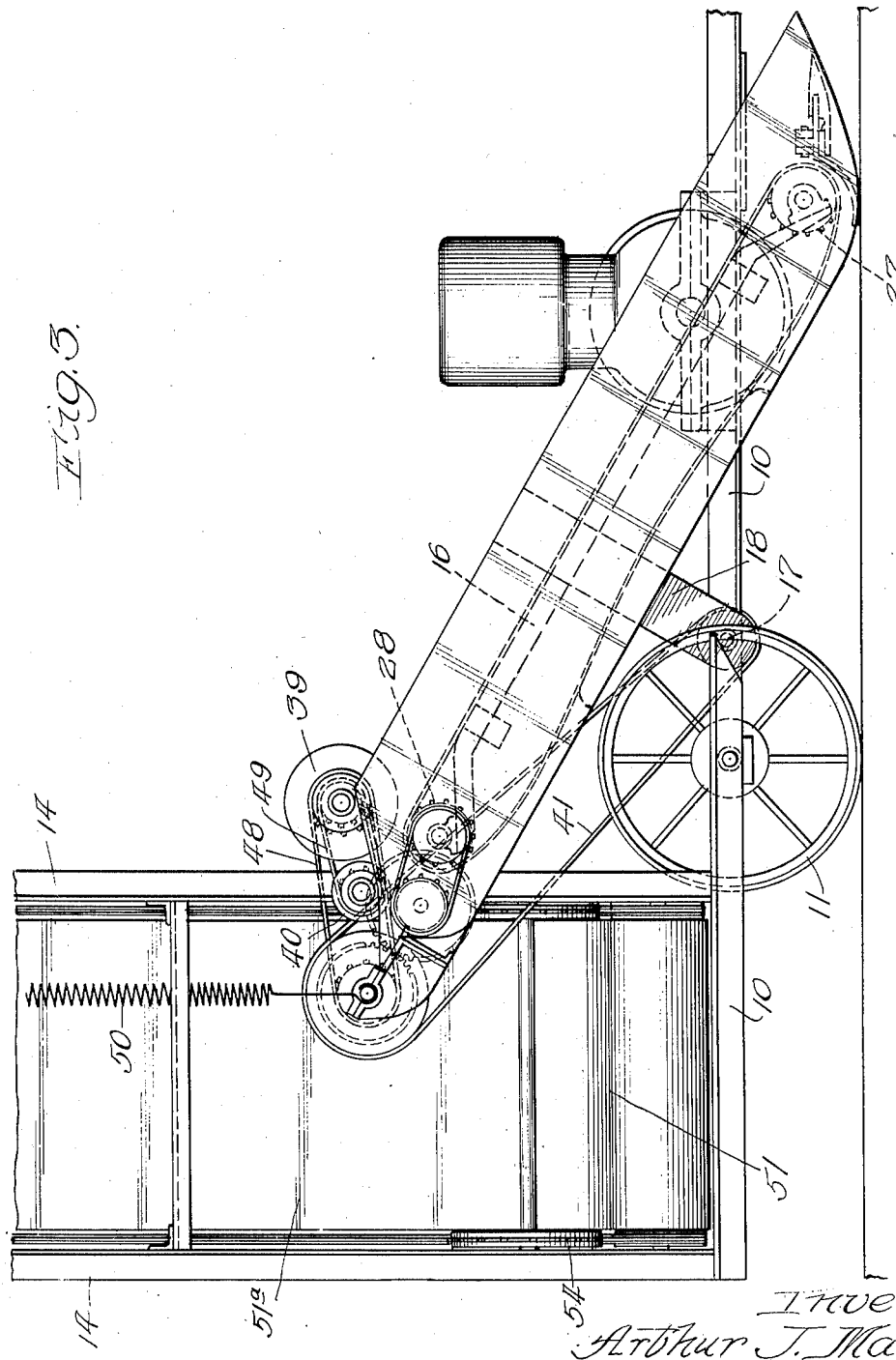

Oct. 15, 1929.  A. J. MASON  1,731,821
HARVESTING MACHINE
Filed July 11, 1927    6 Sheets-Sheet 4
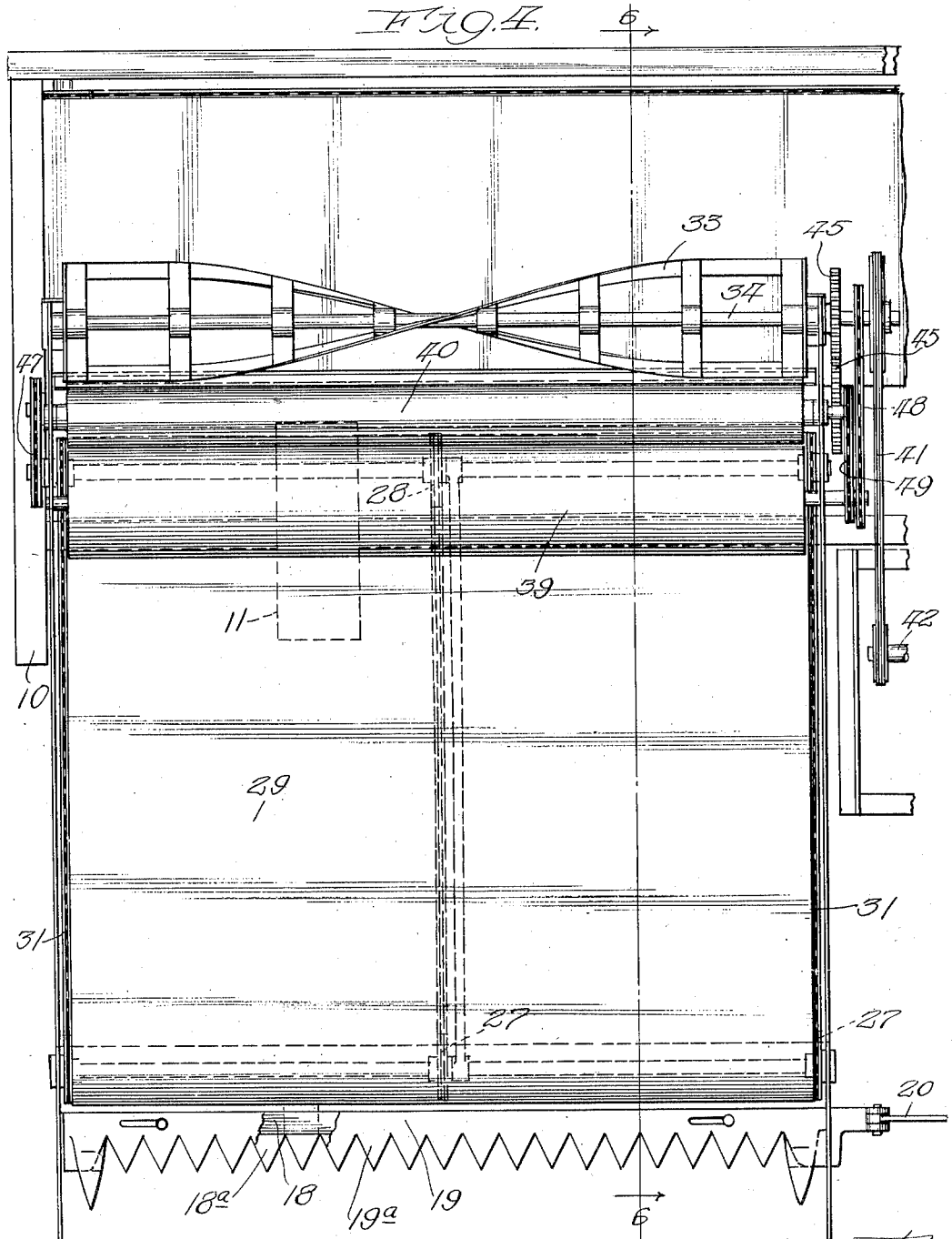

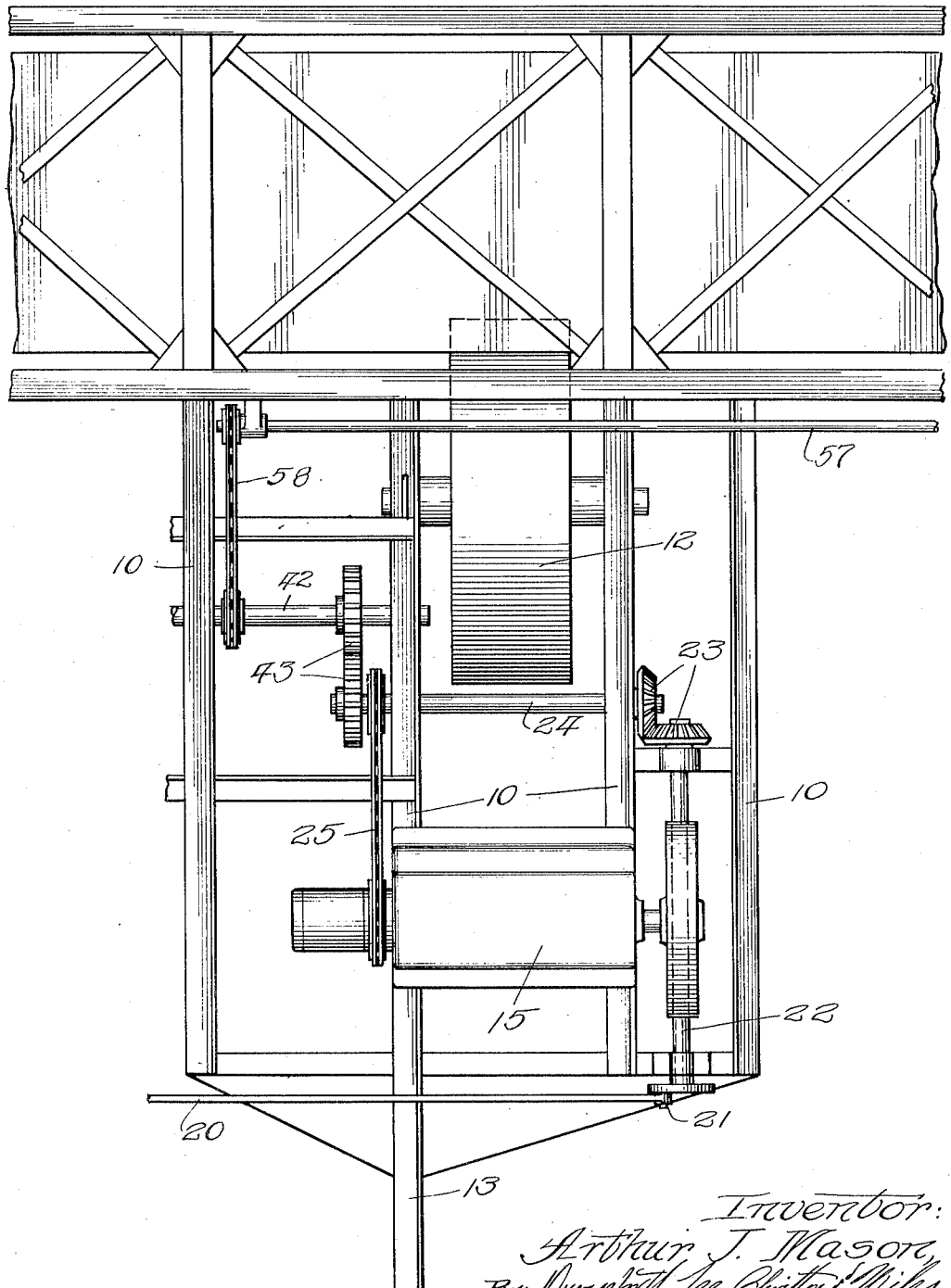

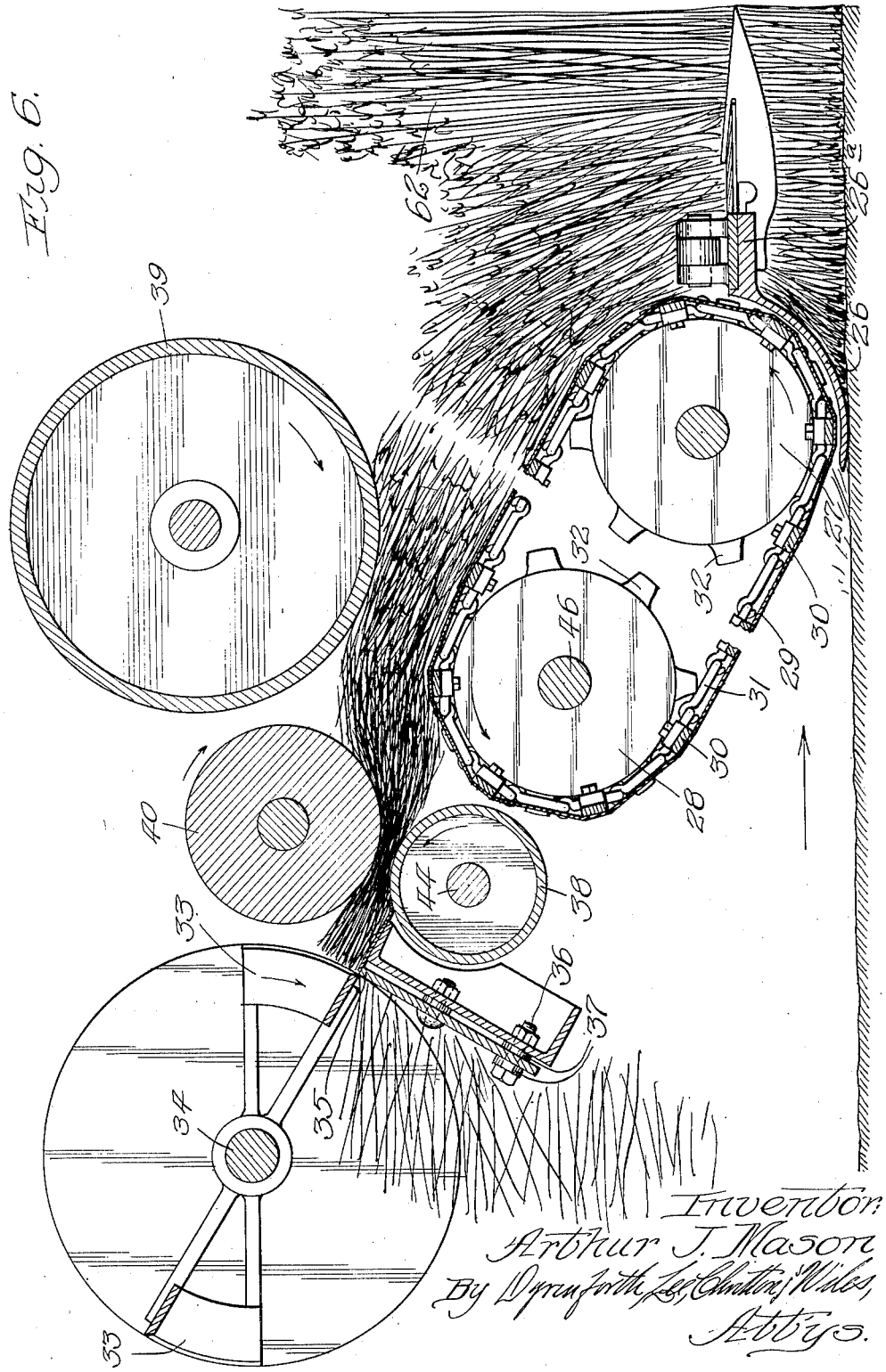

Patented Oct. 15, 1929

1,731,821

UNITED STATES PATENT OFFICE

ARTHUR J. MASON, OF HOMEWOOD, ILLINOIS, ASSIGNOR TO THE MASON ALFALFA PROCESS COMPANY, OF PHILADELPHIA, PENNSYLVANIA, A CORPORATION OF DELAWARE

HARVESTING MACHINE

Application filed July 11, 1927. Serial No. 204,869.

This invention relates to improvements in harvesting machines, and more especially to such a machine particularly for use in the field to harvest growing crops such as alfalfa, hay, and the like.

In my copending patent application Serial No. 129,986, filed August 18, 1926, I disclosed apparatus and process for automatically and continuously forming an endless mat of substantially uniform texture, thickness, density and permeability. In the practice of the invention there disclosed, such a mat formed of the cut crop is passed usually through a drying oven resting upon a conveyor. The conveyor is more or less porous and as it passes through the oven a drying agent is circulated through the mat. In another copending patent application, Serial No. 150,727 filed November 26, 1926, I treated more particularly of such a drying oven. In another copending patent application, Serial No. 152,675 filed December 4, 1926, I disclosed a field wagon especially adapted for receiving the crop as it is cut in the field and conveying it to the mat making machine, where, in connection with unloading apparatus, the contents of the wagon may be unloaded onto the conveyor or feeder of the mat-making machine.

In the present patent application I disclose a harvesting machine especially adapted for harvesting the crop and loading it into a field wagon as shown in my co-pending application Serial No. 152,675 just referred to.

One of the features of my invention is a provision not only for harvesting the crop, but catching it on an inclined conveyor and carrying it to a sufficient height to be transferred to a conveyor at substantially right angles to the first so that the load may be discharged into a truck or wagon traveling at the side of the harvesting or mowing machine.

Another of the features of my invention is the provision of means for not only harvesting the crop but also cutting it or chopping it up into short lengths, so that it is in a form especially well adapted to enter the mat-making machine above referred to.

Another feature of my invention is the provision of means for so mounting the sickle or mower so that irregularities in the ground will not interfere with the proper mowing.

Another feature of the invention is the stiffening of the cutter bar so that the same is more rugged and less likely to bend than the cutter bars do in the ordinary mowers.

Another feature of the invention is a provision of means for conveying the crop after it has been mowed and chopped to a sufficient height so that it can be dumped into a field wagon traveling alongside. In connection with this feature, means are provided to prevent scattering of the crop by the wind as the same is delivered from the harvesting machine into the field wagon.

Other features and advantages of my invention will appear more fully as I proceed with my specification.

In that form of device embodying the features of my invention shown in the accompanying drawings Figure 1 is a top plan view of the harvesting machine, Fig. 2 is a view taken as indicated by the line 2 of Fig. 1, Fig. 3 is a view in side elevation, Fig. 4 is a top plan view of the mowing and chopping unit, Fig. 5 is a top plan view of a part of the machine showing particularly the driving motor, and Fig. 6 is a vertical sectional view taken as indicated by the line 6 of Fig. 4.

As shown in the drawings, the machine comprises a substantially rigid flat frame preferably made up of the angle irons 10, 10 and supported on the two wheels 11 and 12. The machine is not adapted for self propulsion but is to be towed, for example, by a tractor from the tongue 13. At the rear of the flat frame referred to a substantially rigid superstructure 14 is provided, the same extending the entire width of the machine and projecting some distance beyond at one side as indicated by 14ª.

As shown more particularly in Figs. 1 and 5, the frame members 10 carry any suitable operating motor such as, for example, an internal combustion engine 15.

At one side of the frame there is pivotally mounted a mowing, chopping or cutting unit as best shown in Figs. 3 and 4. This unit comprises a substantially rigid rectangular frame 16 which is pivotally mounted to the frame members 10 at 17, 17 by means of the downwardly projecting arms or supports 18 which are attached to the rectangular frame 16. The mowing and chopping unit comprises primarily a mower or sickle at the lower end, a chopper or cutter at the upper end, and a conveyor adapted to carry the mowed material from the mower to the chopper or cutter.

The mower or sickle is of the ordinary type comprising a stationary bar 18 with the teeth 18$^a$ and a reciprocating bar 19 with the teeth 19$^a$. The reciprocating bar 19 is operated by means of a link 20 connecting the same to a crank 21 on the end of a shaft 22 which is driven through the bevel gears 23 by means of a shaft 24 which in turn is driven by the internal combustion motor 15 through the belt 25. One of the features of the mower or sickle is the shoe 26 (see Fig. 6) which serves to stiffen the cutter bar 26$^a$. This curved bar 26 acts as a shoe to correctly space the cutting teeth of the sickle from the ground so that the crop will always be cut a uniform height.

The entire mowing and chopping unit being pivoted at 17, permits the shoe 26 at the lower end to ride over irregularities and unevennesses in the ground so that the crop always will be closely cut.

The frame 16 at its lower end carries a roller 27 and at its upper end a roller 28, these two rollers carrying a flexible conveyor 29 adapted to carry the mowed crop to the upper end of the unit where it is chopped. The conveyor 29 is preferably formed of canvas or similar flexible material as indicated by 29, and stiffened by means of cross-slats 30. There is also preferably provided on the outer margin of each of the conveyors a chain as indicated by 31 passing over sprocket teeth 32 at the ends of the rollers 27 and 28.

At the upper end of the unit there is provided a helical cutter or chopper comprising the two curved knives 33, 33 mounted on the shaft 34 and co-operating with a stationary knife 35 to cut the crop into short lengths after it has been mowed. For example, the crop may be cut in lengths substanatially eight inches long, or any other desired length to better adapt it for entry into the mat-making machine above referred to. Adjustment of the stationary knife 35 is provided by means of the bolts 36 and the rubber washers 37, 37. 38 indicates a roller located between the end of the conveyor 29 and the chopper 33 and adapted to assist in passing material from the conveyor to the chopper. Above these rollers and above the upper end of the conveyor are located a guiding roller 39 and holding roller 40 adapted to assist in directing the crop from the conveyor to the cutter and holding it in position while being cut.

The shaft 34 carrying the cutting device 35 is adapted to be driven by a belt 41 (see Fig. 4) connecting the same to the shaft 42 which in turn is driven from the shaft 24 by means of the pinions 43. The shaft 44 carrying the roller 38 is driven from the shaft 34 by means of the gears 45, 45 and the shaft 44 drives the shaft 46 carrying the drum 28 which actuates the upper end of the conveyor. This drive is accomplished through the chain 47 which connects the shafts 44 and 46 by suitable sprockets. The roller 39 is preferably driven by means of a belt 48 from the shaft 34 and the smaller roller 40 is preferably driven by a belt 49 from the roller 39.

The rear or upper end of the mowing and cutting unit is preferably yieldingly supported from the top of the superstructure 14 by means of the springs 50, as shown, to permit a certain amount of pivoting about the axes 17 so that the shoe 26 is free to ride over irregularities and unevennesses in the ground.

While I have described in the preceding paragraphs devices to re-cut the green material, I wish it to be understood that where the machine is to be habitually used on short crops not requiring this re-cutting such parts as are actually involved in this operation may be omitted without interfering with my method of making the first cut and conveying this material to a truck, wagon, or conveyance traveling at the side of my mower to receive such load.

The rear part of the machine carries a cross conveyor having a horizontal part 51 and an inclined part 51$^a$ which leads to the outer end of the overhanging superstructure 14$^a$. The conveyor is preferably an endless belt flexible conveyor having its lower end supported on the roller 52 and its upper end on the roller 53 at the outer end of the overhanging arm or superstructure 14$^a$. A pair of wheels 54 is provided at the edges of the conveyor where its direction changes from horizontal to an incline. The conveyor is preferably actuated by a bevel gear 55 on the end of the shaft 56 which carries the roller 52. This bevel gear is actuated by a co-operating bevel gear on the end of a shaft 57 which in turn is driven by means of a belt 58 from the shaft 42.

A field wagon, as indicated by 59, for receiving harvested crop is adapted to be drawn beneath the overhanging end of the arm or superstructure 14$^a$, so that the mowed and cut crop as it leaves the conveyor 51 is adapted to drop in such wagon. At this point I preferably provide a hood 60 with a depending skirt 61 to prevent the crop from being scattered by the wind as it leaves the conveyor and falls into the wagon 59.

In the operation of the device, the standing crop as indicated by 62 is mowed by the sickle and falls on the conveyor 29 which moves it up to the chopper. It passes under the rollers 39 and 40, over the roller 38, and is fed to the chopping knives 33. When thus cut or chopped by the chopping knives it falls on the cross conveyor 51 by which it is carried up to the end of the overhanging arm 14ª and drops through the skirt 61 into a wagon 59 below.

It is to be noted that the axis of the shaft 42 is substantially in line with the axes 17 so that pivoting of the mowing and chopping unit does not affect the tension of the driving belt 41.

It is to be noted that the entire machine is nearly balanced on the bull wheel 12, a relatively small proportion of the weight of the same being carried by the auxiliary wheel 11. This construction permits of shaft turning at corners.

While I have shown and described certain embodiments of my invention, it is to be understood that it is capable of many modifications. Changes, therefore, in the construction and arrangement may be made without departing from the spirit and scope of the invention disclosed in the appended claims, in which it is my intention to claim all novelty in my invention as broadly as possible in view of the prior art.

What I claim is new, and desire to secure by Letters Patent, is:

1. A machine of the character described comprising; a frame with supporting wheels; an inclined mowing and chopping unit pivotally supported on said frame; a shoe on the lower end of said unit adapted to ride on the ground; a mower at the lower end of said unit; a chopper at the upper end of said unit; and a conveyor carried by said unit and adapted to move mowed material from the mower to the chopper.

2. A machine of the character described comprising; a frame with supporting wheels; an inclined mowing and chopping unit pivotally supported on said frame; a shoe on the lower end of said unit adapted to ride on the ground; a mower at the lower end of said unit; a chopper at the upper end of said unit; a conveyor carried by said unit and adapted to move mowed material from the mower to the chopper; and a cross conveyor located below the upper end of said unit and adapted to receive chopped material from the chopper and discharge the same at one side of the machine.

3. A machine of the character described comprising; a frame with supporting wheels, said frame having an elevated overhanging arm at one side thereof; an inclined mowing and chopping unit pivotally supported on said frame; a shoe on the lower end of said unit adapted to ride on the ground; a mower at the lower end of said unit; a chopper at the upper end of said unit; a conveyor carried by said unit and adapted to move mowed material from the mower to the chopper; and a cross conveyor having a portion located below the upper end of said unit and adapted to receive chopped material from the chopper, said cross conveyor extending upwardly and outwardly to the end of the overhanging arm of the frame and adapted to discharge chopped material therefrom.

4. A machine of the character described comprising; a frame with supporting wheels; a mower and chopper carried by said frame adapted to mow a crop and chop the same; an overhanging raised arm attached to said frame at one side thereof; an unloading conveyor adapted to carry chopped material from the chopper to said arm and discharge the same therefrom; and a hood carried by said arm and adapted to cover material discharged therefrom.

5. A machine of the character described comprising; a frame with supporting wheels; a mower and chopper carried by said frame adapted to mow a crop and chop the same; an overhanging raised arm attached to said frame at one side thereof; an unloading conveyor adapted to carry chopped material from the chopper to said arm and discharge the same therefrom; a hood carried by said arm and adapted to cover material discharged therefrom; and a depending skirt carried by said hood, discharged material adapted to pass through said skirt.

6. A machine of the character described comprising; a frame with supporting wheels; an inclined mowing and chopping unit pivotally supported on said frame; a mower at the lower end of said unit, including a cutter bar provided with a curved stiffening shoe adapted to rest on the ground; a chopper at the upper end of said unit; and a conveyor carried by said unit and adapted to carry mowed material from the mower to the chopper.

7. A machine of the character described comprising; a frame with supporting wheels; a mower carried by said frame; a chopper carried by said frame; and a conveyor adapted to carry mowed material from the mower to the chopper, said conveyor comprising an endless belt carried on two rollers, cross stiffening slats for said belt, and chains at the sides of said belt, said rollers having sprocket teeth at their ends to engage said chains.

8. A machine of the character described comprising; a frame with supporting wheels; a mower carried by said frame; a chopper carried by said frame and located on a higher level than the mower; an inclined conveyor adapted to carry mowed material from the mower to the chopper; and a second conveyor located below the chopper and adapted to carry chopped material therefrom to a discharge point.

9. A machine of the character described; a frame with supporting wheels; a mower carried by said frame; a chopper carried by said frame on a higher level than the mower;

a conveyor adapted to carry mowed material from the mower to the chopper; an elevated overhanging discharge arm carried by the frame; and a discharge conveyor located below the chopper and extending therefrom to the discharge arm, said conveyor adapted to carry material from the chopper to the discharge arm.

10. A machine of the character described comprising; a frame with supporting wheels; an inclined mowing unit pivotally supported on said frame; a shoe on the lower end of said unit adapted to ride on the ground; a mower at the lower end of said unit; and a conveyor carried by said unit and adapted to move mowed material from the mower to the upper end of said unit.

11. A machine of the character described comprising; a frame with supporting wheels; an inclined mowing unit pivotally supported on said frame; a shoe on the lower end of said unit adapted to ride on the ground; a mower at the lower end of said unit; a conveyor carried by said unit and adapted to move mowed material from the mower to the upper end of said unit; and a cross conveyor located below the upper end of said unit and adapted to receive material from the upper end of said unit and discharge the same at one side of the machine.

12. A machine of the character described comprising; a frame with supporting wheels, said frame having an elevated overhanging arm at one side thereof; an inclined mowing unit pivotally supported on said frame; a mower at the lower end of said unit; a conveyor carried by said unit and adapted to move mowed material from the mower to the upper end of said unit; and a cross conveyor having a portion located below the upper end of said unit and adapted to receive chopped material from the upper end of said unit, said cross conveyor extending upwardly and outwardly to the end of the overhanging arm of the frame and adapted to discharge chopped material therefrom.

In witness whereof, I have hereunto set my hand this 16th day of June, 1927.

ARTHUR J. MASON.